Jan. 17, 1950     F. J. WEST ET AL     2,494,975
ROTARY GRATE HAVING FUEL CUTTING MEANS

Filed Feb. 18, 1946     3 Sheets-Sheet 1

Inventors
F. J. West
E. West

Inventors
F. J. West
E. West
By Glascock Downing Seebold
Attys

Patented Jan. 17, 1950

2,494,975

UNITED STATES PATENT OFFICE 2,494,975

ROTARY GRATE HAVING FUEL CUTTING MEANS

Frederick Joseph West and Ernest West, Manchester, England, assignors to West's Gas Improvement Company Limited, Manchester, England, a British company Application February 18, 1946, Serial No. 648,518
In Great Britain January 4, 1945

Section 1, Public Law 690, August 8, 1946
Patent expires January 4, 1965

6 Claims. (Cl. 126—182)

This invention relates to gas producers and has for its object to provide an improved construction and arrangement of producer grate which enhances the efficiency of the apparatus.

Our invention consists in a gas producer having its grate in the form of a perforated helix having a rotatable cylindrical casing, and a grate supported within the casing and consisting of a perforated plate in the form of a portion of a helix terminated by radial edges disposed one above the other in spaced relation.

Our invention further comprises the provision of a grate removably supported within the casing and consisting of a perforated plate in the form of a helix of substantially one convolution, terminated by radial edges disposed one above the other in spaced relation, the upper radial edge being sharpened to form a cutting edge and being formed on a detachable portion of the plate.

Our invention also comprises further features hereinafter described and claimed.

Referring to the accompanying explanatory drawings.

Figure 1:
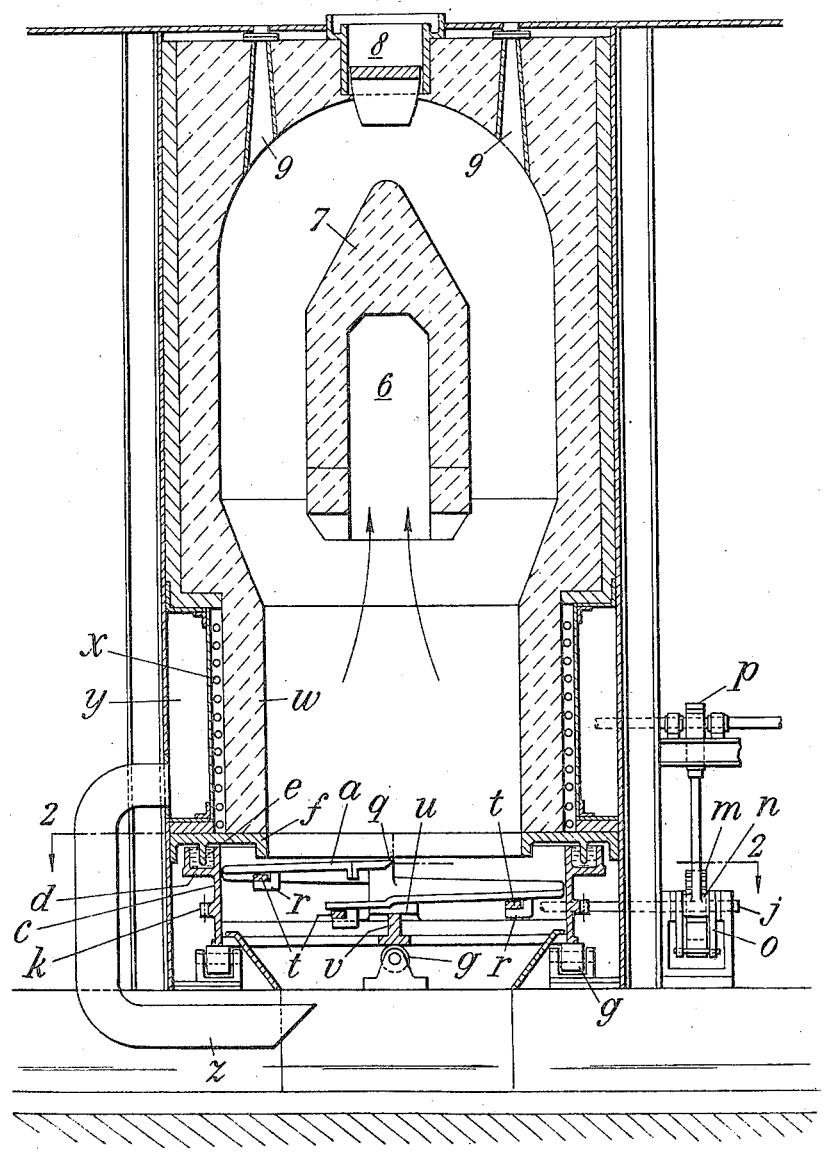
Figure 1 is a sectional elevation and Figure 2 a sectional plan on the line 2—2 of Figure 1 showing a gas producer with its grate constructed in one convenient form in accordance with this invention.
Figure 2:
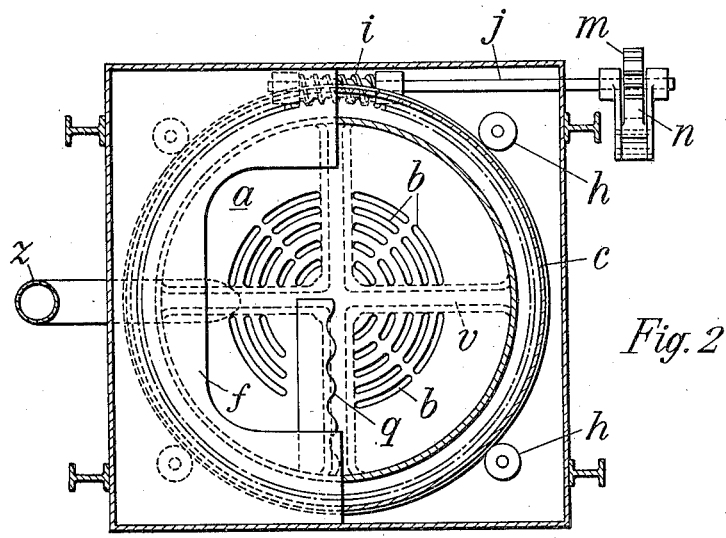
Figure 6:
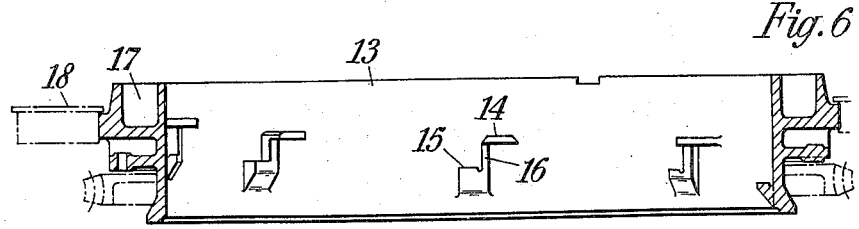
Figure 5:
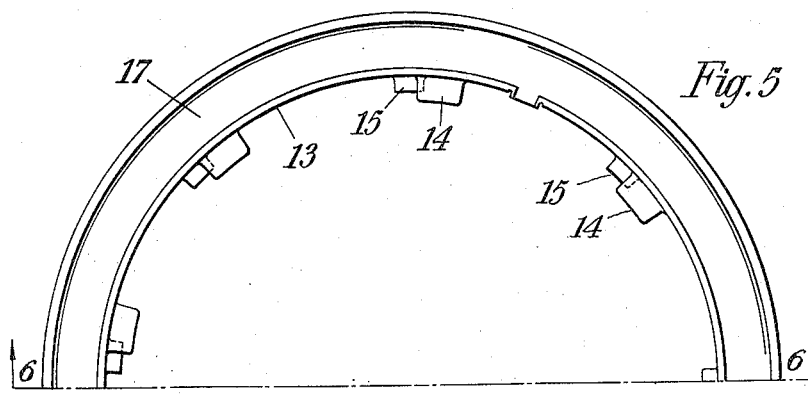
Figure 4:
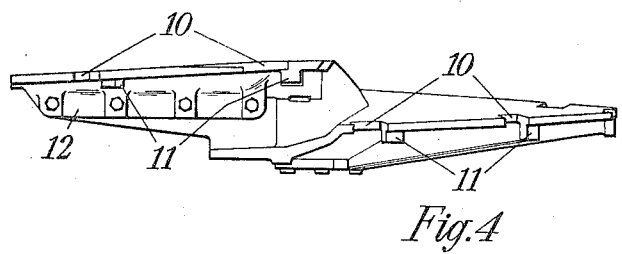
Figure 3:
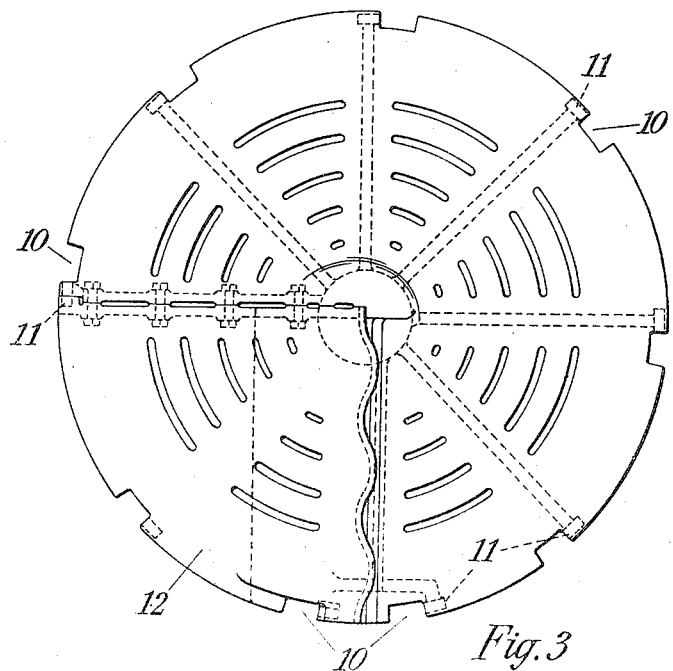
Figure 3 is a plan view, Figure 4 an elevation of a modified construction of grate and Figure 5 a plan view of one half of a cylindrical casing and Figure 6 a sectional elevation on the line 6—6 of Figure 5 showing a modified construction of cylindrical casing adapted to receive the grate of Figures 3 and 4.

In Figures 1 and 2 the producer grate is in the form of a perforated plate $a$ in the form of a portion of a helix of substantially one convolution terminated by radial edges disposed one above the other in spaced relation with apertures $b$ therethrough for the passage of air for the partial combustion of the fuel thereon. The grate is mounted in a cylindrical casing $c$ having an annular water trough $d$ at its upper end which forms a seal with the depending ring $e$ upon the bottom $f$ of the producer casing. The casing $c$ is supported upon rollers $g$, Figure 1, and is restrained laterally by further rollers $h$ (see Figure 2). It is revolved by a worm $i$ upon a shaft $j$ which meshes with worm wheel teeth at $k$ on the exterior of the casing $c$. The shaft $j$ has a ratchet wheel $m$ thereon which is turned by a pawl $n$ on an arm $o$ oscillated by an excentric at $p$. The upper radial edge $q$ of the helix is shaped as a cutting edge. The underside of the helix has jawlike clips $r$ thereon which engage luglike projections $t$ on the interior of the casing $c$. The centre $u$ of the base of the spiral $a$ rests upon a cruciform member $v$ extending from side to side of the cylindrical casing. It will be seen that the grate $a$ is supported and revolved by the casing $c$ and can be removed from such casing when it is withdrawn from beneath the producer by turning the grate relatively to the casing $c$, so that the clips $r$ pass off the lugs $t$, and lifting it out thereof.

The refractory lining $w$ of the producer immediately above the grate $a$ is surrounded by a coil or coils of tubes $x$ through which cooling water is circulated and around such coil or coils is arranged an air jacket $y$ through which air for combustion in the producer is passed. The hot air is passed by the pipe $z$ to beneath the grate. Alternatively a water jacket may be used with or without the air jacket $y$.

The gas off-take 6 from the producer is situated beneath an arch 7 (having a conical top in section) extending across the producer beneath the charging opening 8.

The gas producer has the usual poking apertures 9 in its roof and is enlarged at the part where the gas off-take arch 7 is situated.

In the modified construction of grate shown in Figures 3–6, there are gaps 10 in the peripheral edge of the grate and there is a support surface 11 on the underside of the grate adjacent to each gap 10. The upper radial edge of the grate is sharpened to form a cutting edge, and is formed on a portion 12 which constitutes approximately one quarter of the plate and is detachable and renewable. On the interior surface of the cylindrical casing 13 are a number of stepped lugs, that is an upper lug 14 and a lower lug 15 connected by a riser 16. The arrangement is such that if the grate is inserted in the cylindrical casing from below, the gaps 10 can be passed over the lower lugs 15, after which the grate is given a small turn to bring the gaps 10 beneath the upper lugs 14 to prevent ash falling through the gaps and the support surfaces 11 on the grate upon the lower lugs 15. One edge of each gap 10 engages a riser 16 which limits the turning of the grate and also provides for the driving of the grate by the casing during the operation of the producer. 17 indicates the liquid sealing trough and 18 the rollers which restrain the casing 13 laterally as it is being revolved.

What we claim is:

1. In a gas producer, a rotatable cylindrical casing, and a grate supported within the casing and consisting of a perforated plate in the form of a portion of a helix terminated by radial edges disposed one above the other in spaced relation.

2. In a gas producer, a rotatable cylindrical casing, and a grate removably supported within the casing and consisting of a perforated plate in the form of a helix of substantially one convolution, terminated by radial edges disposed one above the other in spaced relation.

3. In a gas producer, a rotatable cylindrical casing, and a grate removably supported within the casing and consisting of a perforated plate in the form of a helix of substantially one convolution, terminated by radial edges disposed one above the other in spaced relation, the upper radial edge being sharpened to form a cutting edge.

4. In a gas producer, a rotatable cylindrical casing, and a grate removably supported within the casing and consisting of a perforated plate in the form of a helix of substantially one convolution, terminated by radial edges disposed one above the other in spaced relation, the upper radial edge being sharpened to form a cutting edge and being formed on a detachable portion of the plate.

5. In a gas producer, a rotatable cylindrical casing, a grate consisting of a perforated plate in the form of a helix of substantially one convolution, terminated by radial edges disposed one above the other in spaced relation, and lugs in the casing for removably supporting the periphery of the grate within the casing.

6. In a gas producer, a rotatable cylindrical casing, a grate consisting of a perforated plate bounded by a helical curve at its periphery and by two radial edges disposed one above the other in spaced relation and extending from the periphery to the centre part of the grate, and means for removably supporting the grate within the casing.

FREDERICK JOSEPH WEST.
ERNEST WEST.

REFERENCES CITED

The following references are of record in the file of this patent:

UNITED STATES PATENTS

| Number | Name | Date |
|---|---|---|
| 386,665 | Solvay | July 24, 1888 |
| 456,733 | Pederson | July 28, 1891 |
| 857,210 | Stackhouse | June 18, 1907 |
| 1,078,071 | Tait | Nov. 11, 1913 |
| 1,287,505 | Steiger | Dec. 10, 1918 |
| 1,964,614 | Williams | June 26, 1934 |
| 2,108,764 | Deringer | Feb. 15, 1938 |
| 2,289,347 | Daae | July 14, 1942 |